(12) United States Patent
Adkins et al.

(10) Patent No.: US 11,655,176 B2
(45) Date of Patent: May 23, 2023

(54) METHOD FOR DECREASING BUBBLE LIFETIME ON A GLASS MELT SURFACE

(71) Applicant: CORNING INCORPORATED, Corning, NY (US)

(72) Inventors: Laura Rose Van Cott Adkins, Corning, NY (US); William Gurney Dorfeld, Salida, CO (US)

(73) Assignee: Corning Incorporated, Corning, NY (US)

(*) Notice: Subject to any disclaimer, the term of this patent is extended or adjusted under 35 U.S.C. 154(b) by 8 days.

(21) Appl. No.: 17/294,833

(22) PCT Filed: Nov. 14, 2019

(86) PCT No.: PCT/US2019/061413
§ 371 (c)(1),
(2) Date: May 18, 2021

(87) PCT Pub. No.: WO2020/106539
PCT Pub. Date: May 28, 2020

(65) Prior Publication Data
US 2022/0017398 A1    Jan. 20, 2022

Related U.S. Application Data

(60) Provisional application No. 62/770,250, filed on Nov. 21, 2018.

(51) Int. Cl.
*C03B 5/235* (2006.01)
*C03B 5/20* (2006.01)
*C03B 7/096* (2006.01)

(52) U.S. Cl.
CPC ............. *C03B 5/235* (2013.01); *C03B 5/20* (2013.01); *C03B 7/096* (2013.01)

(58) Field of Classification Search
None
See application file for complete search history.

(56) References Cited

U.S. PATENT DOCUMENTS 4,247,320 A  *  1/1981  Bansal ................. C03B 17/04
                                                    65/327
5,509,951 A     4/1996  Baucke et al.
(Continued)

FOREIGN PATENT DOCUMENTS

CN          1332329 A       1/2002
CN          1190624 C       2/2005
(Continued)

OTHER PUBLICATIONS

Parmelee et al. The Surface Tensions of Molten Glass, University of Illinois Bulletin vol. XXXVI No. 81, Jun. 6, 1939. (Year: 1939).*
(Continued)

*Primary Examiner* — Queenie S Dehghan
(74) *Attorney, Agent, or Firm* — Kevin M. Able

(57) ABSTRACT

A method of reducing bubble lifetime on the free surface of a volume of molten glass contained within or flowing through a vessel including a free volume above the free surface, thereby minimizing re-entrainment of the bubbles back into the volume of molten glass and reducing the occurrence of blisters in finished glass products. The method includes vaporizing a volatile material, entraining the vapor in a carrier gas to form an enrichment gas, and flowing the enrichment gas into the free volume to increase a concentration of the volatile material at the surface of the molten glass in the vessel.

14 Claims, 4 Drawing Sheets

(56) References Cited

U.S. PATENT DOCUMENTS

| | | | |
|---|---|---|---|
| 6,705,118 B2 | 3/2004 | Simpson et al. | |
| 6,851,280 B2 | 2/2005 | Ott et al. | |
| 7,454,925 B2 | 11/2008 | Deangelis et al. | |
| 8,661,852 B2 | 3/2014 | Leister et al. | |
| 9,708,210 B2 | 7/2017 | Nguyen et al. | |
| 2001/0055930 A1 | 12/2001 | Ott et al. | |
| 2005/0217317 A1 | 10/2005 | Lautenschlaeger et al. | |
| 2006/0042318 A1* | 3/2006 | Burdette | C03B 5/16 65/346 |
| 2007/0151297 A1 | 7/2007 | Deangelis et al. | |
| 2010/0018251 A1 | 1/2010 | Lautenschlaeger et al. | |
| 2010/0199720 A1* | 8/2010 | Roemer | C03B 5/43 65/134.1 |
| 2010/0199721 A1 | 8/2010 | Antoine et al. | |
| 2011/0034316 A1 | 2/2011 | Leister et al. | |
| 2014/0208800 A1 | 7/2014 | McCann et al. | |
| 2015/0344342 A1 | 12/2015 | Nguyen et al. | |

FOREIGN PATENT DOCUMENTS

| | | | |
|---|---|---|---|
| CN | 101351414 A | 1/2009 | |
| CN | 102307821 A | 1/2012 | |
| CN | 104445869 A | 3/2015 | |
| CN | 204689869 U | 10/2015 | |
| CN | 105246843 A | 1/2016 | |
| CN | 204999795 U | 1/2016 | |
| CN | 205387539 U | 7/2016 | |
| CN | 205556444 U | 9/2016 | |
| CN | 106746497 A | 5/2017 | |
| DE | 102009002336 A1 | 10/2010 | |
| EP | 967180 A1 * | 12/1999 | C03B 5/205 |
| EP | 1968904 A2 | 9/2008 | |
| GB | 2450588 A | 12/2008 | |
| JP | 2006-347828 A | 12/2006 | |
| JP | 2010-052968 A | 3/2010 | |
| JP | 2010-052971 A | 3/2010 | |
| JP | 2012-017256 A | 1/2012 | |
| JP | 2013-075823 A | 4/2013 | |
| JP | 2014-009125 A | 1/2014 | |
| JP | 2016-069252 A | 5/2016 | |
| JP | 2016-190753 A | 11/2016 | |
| KR | 10-2015-0113887 A | 10/2015 | |
| KR | 10-2015-0113897 A | 10/2015 | |
| WO | 2007/078875 A2 | 7/2007 | |
| WO | WO-2007109214 A2 * | 9/2007 | B01B 1/005 |
| WO | 2008/029649 A1 | 3/2008 | |
| WO | 2008/093580 A1 | 8/2008 | |
| WO | 2011/007840 A1 | 1/2011 | |
| WO | 2011/078258 A1 | 6/2011 | |
| WO | 2014/083923 A1 | 6/2014 | |
| WO | 2015/099143 A1 | 7/2015 | |
| WO | 2018/170392 A2 | 9/2018 | |

OTHER PUBLICATIONS

International Search Report and Written Opinion of the International Searching Authority; PCT/US2019/061413; dated Mar. 31, 2020; 11 pages; European Patent Office.

Beerkens et al; "Gas Release and Foam Formation During Melting and Fining of Glass" Journal of American Ceramic Society, vol. 89, Issue 1, 2006 pp. 24-35.

Helena Kocarkova; "Stability of Glass Foams: Experiments at the Bubble Scale and on Vertical Film"; Other (Cond-Mat.Other]. Universite Paris-Est, 2011. English. <NNT:2011PEST1092>.

Kawaguchi et al., "Challenge to improve glass melting and fining process" Ceramics Silikaty, vol. 52, issue 4, 2008, pp. 217-224.

Peterson et al. "An Overview of Gas-Injection Fining." In New Glass, vol. 21, No. 4, 2006, pp. 18-24.

Chinese Patent Application No. 201980089883.9, Office Action, dated Sep. 21, 2022, 2 pages of English Translation, Chinese Patent Office.

\* cited by examiner

METHOD FOR DECREASING BUBBLE LIFETIME ON A GLASS MELT SURFACE

CROSS-REFERENCE TO RELATED APPLICATIONS

This application is a national stage application under 35 U. S. C. § 371 of International Application No. PCT/US2019/061413, filed on Nov. 14, 2019, which claims the benefit of priority of U.S. Provisional Application Ser. No. 62/770,250 filed on Nov. 21, 2018 the contents of which are relied upon and incorporated herein by reference in their entirety as if fully set forth below.

BACKGROUND

Field

The present disclosure relates generally to methods for forming a glass article, and more particularly for introducing a surfactant into a vessel to decrease bubble lifetime at the surface of a volume of molten glass within the vessel.

Technical Background

The manufacture of optical quality glass articles, such as glass substrates used in the manufacture of lighting panels, or liquid crystal or other forms of visual displays, involves high temperature processes that include the transport of molten glass through various passages (e.g., vessels). Some of these passages can contain a free volume, for example a gaseous atmosphere above a surface of the molten glass. Bubbles that rise to the surface are commonly expected to spontaneously burst, or "pop" quickly upon reaching the surface, but in some instances may not, thereby risking re-entrainment into the molten glass. Such delays in bubble popping can be the result of an increase in surface tension of the bubble membrane.

SUMMARY

Methods described herein can modify the surface tension of bubble membranes existing on the free surface of molten glass contained in and/or flowing through a vessel (e.g., conduit, container, tank, etc.), thereby reducing the lifetime of the bubbles on the surface of the molten glass and minimizing the possibility of re-entrainment of the bubble within the volume of molten glass. Thus, the occurrence of blisters (bubbles) in finished glass articles can be reduced.

Accordingly, a method of reducing bubble lifetime in molten glass is described, the method comprising forming molten glass in a melting vessel, directing the molten glass through a conditioning vessel downstream of the melting vessel, the conditioning vessel containing a free volume above a free surface of the molten glass in the conditioning vessel, and flowing an enrichment gas comprising a volatile material into the free volume, the volatile material reducing a surface tension of the molten glass in the conditioning vessel.

In some embodiments, the flowing an enrichment gas comprises flowing a carrier gas over a source of the volatile material and heating the source of volatile material.

The method may further comprise comprising controlling a concentration of the volatile material in the enrichment gas by controlling a temperature of the source of volatile material.

In some embodiments, the method can include controlling a concentration of the volatile material in the enrichment gas by controlling a flow rate of the enrichment gas.

In various embodiments, an atmosphere in the free volume can be saturated with the volatile material.

The conditioning vessel may comprise a fining vessel or a stirring vessel.

In some embodiments, the conditioning vessel can comprise a fining vessel.

In various embodiments, the volatile material can comprise $B_2O_3$.

In other embodiments, a method of reducing bubble lifetime in a glass making process is described, comprising forming a molten glass in a melting vessel, flowing the molten glass through a conditioning vessel downstream of the melting vessel, the conditioning vessel comprising a free volume above a free surface of the molten glass. The method may further comprise flowing a carrier gas through a surfactant distribution vessel comprising a source of $B_2O_3$ and heating the surfactant distribution vessel to melt the source of $B_2O_3$ and form a boron-comprising vapor. The method may still further comprise entraining the boron-comprising vapor in the carrier gas to form an enrichment gas and flowing the enrichment gas into the free volume of the conditioning vessel.

In some embodiments, the free volume comprises an atmosphere, and a concentration of $B_2O_3$ in the atmosphere is maintained in saturation.

In embodiments, a partial pressure of $B_2O_3$ in the free volume can be equal to or greater than a partial pressure of $B_2O_3$ within a bubble in the molten glass.

In some embodiments, a partial pressure of $B_2O_3$ in the free volume can be controlled by controlling a temperature of the source of $B_2O_3$ in the surfactant distribution vessel.

In some embodiment, the source of $B_2O_3$ can be pure $B_2O_3$.

In some embodiments, the molten glass in the conditioning vessel is a first molten glass and the source of $B_2O_3$ in the surfactant distribution vessel is a second molten glass. For example, a composition of the second molten glass can be different from a composition of the first molten glass.

In some embodiments, the conditioning vessel can comprise a fining vessel.

In some embodiments, the conditioning vessel can comprise a stirring vessel.

In some embodiments, the conditioning vessel can comprise a fining vessel and a stirring vessel.

The method may further comprise directing the molten glass from the conditioning vessel to a forming body and drawing the molten glass from the forming body.

In still other embodiments, an apparatus for reducing bubble lifetime in a glass making process is described comprising a melting vessel configured to form molten glass, a conditioning vessel downstream of the melting vessel and configured to receive the molten glass from the melting vessel, the conditioning vessel containing a free volume above a free surface of the molten glass in the conditioning vessel, a surfactant distribution vessel in fluid communication with the conditioning vessel, the surfactant distribution vessel containing a source of volatile material, for example $B_2O_3$, and a carrier gas source in fluid communication with the surfactant distribution vessel.

In embodiments, a heating element can be arranged to heat the surfactant distribution vessel.

Additional features and advantages of the embodiments disclosed herein will be set forth in the detailed description that follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure and together with the description serve to explain the principles and operations thereof.

DETAILED DESCRIPTION

Figure 1:
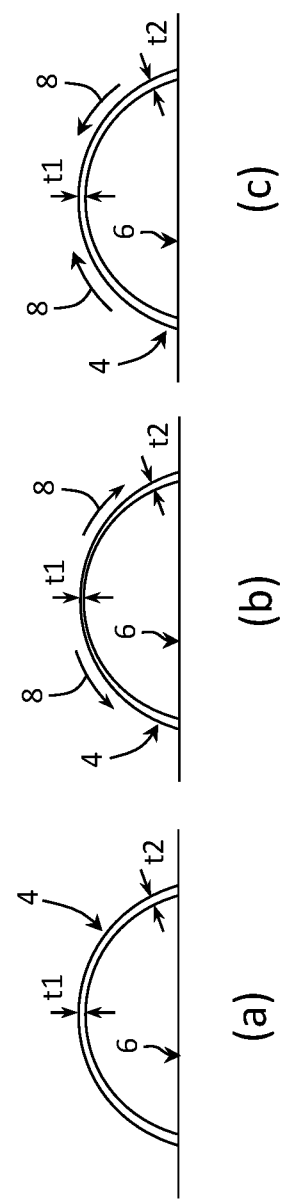
FIG. 1 comprises a sequence of schematic illustrations of a molten glass bubble as the bubble experiences the Marangoni effect.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as may be used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "free volume" in the context of a conduit or other vessel containing a molten material, such as molten glass, shall be construed as referring to a volume of the vessel unoccupied by molten glass. More particularly, the free volume extends between a surface of the molten glass within the vessel and a top of the vessel, and may contain, for example, one or more gases, vapors or other non-solid or non-liquid constituents. The free volume interfaces with the molten material at a "free surface" of the molten material. The molten material may be contained in the vessel or be flowing through the vessel.

As used herein, "molten glass" shall be construed to mean a molten material which, upon cooling, can enter a glassy state. The term molten glass is used synonymously with the term "melt". The molten glass may form, for example, a majority silica glass, although the present disclosure is not so limited.

As used herein, the term "redox" refers to either one or both of a reducing chemical reaction or an oxidation chemical reaction.

As used herein, a refractory material is a non-metallic material with chemical and physical properties that make them applicable for structures, or as components of systems, that are exposed to environments above about 538° C.

Blisters (bubbles) in a final glass article can result in a reduced production yield, which is typically commercially undesirable. Bubbles in the glass can be removed, for example, by a fining process where the molten glass is heated to decrease a viscosity of the molten glass and the redox state of the molten glass is shifted to release additional oxygen into existing bubbles, causing the bubbles to grow. The increased buoyancy of the bubbles combined with the reduced viscosity of the molten glass facilitates a rise of the bubbles to the free surface of the molten glass, where the bubbles pop. Gas that was contained within the bubbles enters the free volume and can then leave the vessel, either through deliberate venting or through leaks or other outlets in the vessel.

Historically, bubble popping was assumed to occur very quickly after the bubbles reached the free surface of a glass melt. However, it has been found that bubbles can persist on the surface of a melt for sufficient time that the bubbles can exchange with a gaseous atmosphere above the melt and thereafter become re-entrained within the melt.

Analysis of blisters in finished glass articles has shown a significant proportion of $N_2$ gas. Because the glasses investigated did not otherwise contain appreciable amounts of dissolved nitrogen, and nitrogen is a majority gas often used in an atmosphere contained within the free volume of metallic vessels for conveying molten glass to reduce oxidation of the metallic vessels, it is theorized the blisters obtained their high $N_2$ gas content during exchange with the atmosphere above the melt, i.e., at a free surface of the melt. Such gas exchange requires persistence of the bubbles on the surface of the melt for a time sufficient to accommodate the gaseous exchange, and for the bubbles to re-enter the volume of molten glass and thereafter become fixed in the final glass product. Free surfaces that could potentially contribute to re-entrainment may be found, for example, in fining vessels and stirring vessels, although free surfaces may be found in other vessels as well. However, for bubbles in the melt to show up as blisters in the final glass article after reaching a free surface of the melt, the bubbles must first avoid popping as they sit on the free surface of the melt.

Within a pool of molten glass, bubble popping is preceded by drainage of the bubble membrane as the bubble sits on the surface of the melt. Drainage occurs by two principal means, regular drainage and irregular drainage. In regular drainage, the bubble membrane becomes thinner with time as the liquid comprising the bubble membrane drains back into the melt due to gravity. When sufficient material has drained from the membrane to cause the thickness of the membrane, particularly at the top of the bubble, to be reduced to a threshold thickness, the bubble pops. In irregular drainage, bands of molten material may move across the surface of the bubble membrane, and the bubble membrane will decrease in thickness with time much more slowly than in the case of regular drainage. Irregular drainage is thought to be caused by the Marangoni effect (Gibbs-Marangoni effect), wherein a surface tension gradient along the bubble membrane creates a flow of material from regions of low surface tension to regions of higher surface tension. The Marangoni effect can produce a flow that opposes gravity-induced drainage, keeping the bubble membrane thickness, particularly at the top of the bubble, above the threshold thickness where popping occurs.

Figure 2:
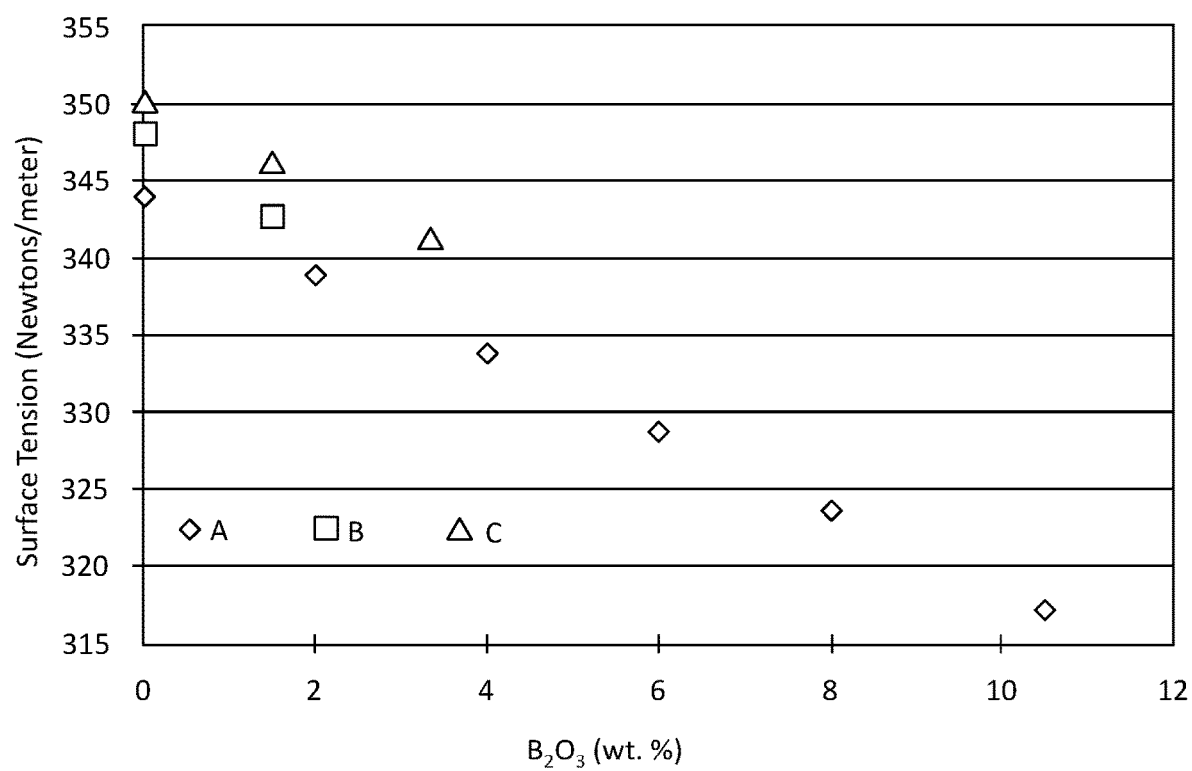
FIG. 2 is a plot showing surface tension as a function of $B_2O_3$ concentration in weight percent (wt. %)

Without wishing to be bound by theory, it is thought that the high temperature within the molten glass-containing vessel, the presence of volatile constituents in the molten glass, and the generally singular (non-interconnected) nature of the bubbles within certain glass making processes can result in a surface tension gradient on the bubble membrane. This gradient, owing to the Marangoni effect, produces a thickening of the bubble membrane, for example at the top of the bubble, that prolongs bubble lifetime on the surface of the melt. Referring to FIG. 1, a sequence of periods in bubble lifetime is shown. At (a), a bubble 4 is shown very shortly after the bubble reaches the free surface 6 of the molten glass. Bubble 4 is illustrated with a generally consistent membrane thickness between the top thickness t1 and the base thickness t2. At (b), the bubble membrane has begun to drain back into the melt, as indicated by arrows 8 and reflected by the noticeable thinning at the top of the bubble: t1 decreases and t2 may show an increase. It should be noted that at high temperatures, various chemical constituents of the glass melt can be lost at free surfaces of the melt due to volatilization. When certain easily-volatilized chemical constituents of the molten glass, such as boron (B), are lost, the surface tension of the molten glass is increased. For example, FIG. 2 is a plot showing surface tension in Newtons/meter (N/m) as a function of $B_2O_3$ concentration (in weight percent) in the molten phase of three aluminoborosilicate glass compositions A, B, and C. The plot illustrates a strong dependence of surface tension on the concentration of $B_2O_3$ in the glasses.

Other volatile constituents can include alkali elements (Li, Na, K, Rb, Cs and Fr) and alkali earth elements (Be, Mg, Ca, Sr, Ba and Ra). Additional volatile constituents can include V, Ti and/or F. The volatilization of glass constituents from the melt is accentuated in the bubble membrane when compared with the free surface of the molten glass because the bubble membrane is largely isolated from the bulk melt and includes an atmosphere on both sides of the membrane. More importantly, thinning of the bubble membrane at the top of the bubble due to initial draining of the bubble membrane means the volatilization of constituents at the top of the bubble has a greater impact on surface tension at the top of the bubble than the volatilization of glass constituents at the base of the bubble. This can occur at least because a given evaporation rate will alter the local melt composition faster in the thinner portion of the bubble membrane than the thicker portion of the bubble membrane, and therefore the thinner portion of the bubble membrane will proportionally experience a greater change in surface tension than the base of the bubble membrane. For example, the path for release of volatile glass constituents from an interior of the bubble membrane to a surrounding atmosphere is shorter for the thin bubble membrane portion than for the thicker bubble membrane portion. The resulting surface tension gradient formed between the upper (top) portion of the bubble and the base of the bubble closest to the bulk melt surface is what facilitates the Marangoni effect. Accordingly, referring again to FIG. 1, at (c), the flow 8 of molten glass within the bubble membrane has reversed, with molten glass flowing to the top of the bubble membrane rather than draining, thereby increasing the top thickness t1 compared, for example, to (b). Unaddressed, the Marangoni effect can cause and/or prolong irregular drainage and extend bubble lifetimes. It can be appreciated therefore that raising local temperatures to reduce viscosity as an aid to bubble drainage and further induce bubble popping can, conversely, worsen the Marangoni effect and extend bubble lifetime.

In accordance with the present disclosure, it has been found that the re-addition of a volatile material as a surfactant, for example a material comprising boron (e.g., $B_2O_3$), into molten glass at the surface of the molten glass, and more particularly into the bubble membrane, can reduce surface tension at the bubble membrane, thereby reducing or avoiding the Marangoni effect, irregular drainage, and the resultant extended bubble lifetimes.

Figure 3:
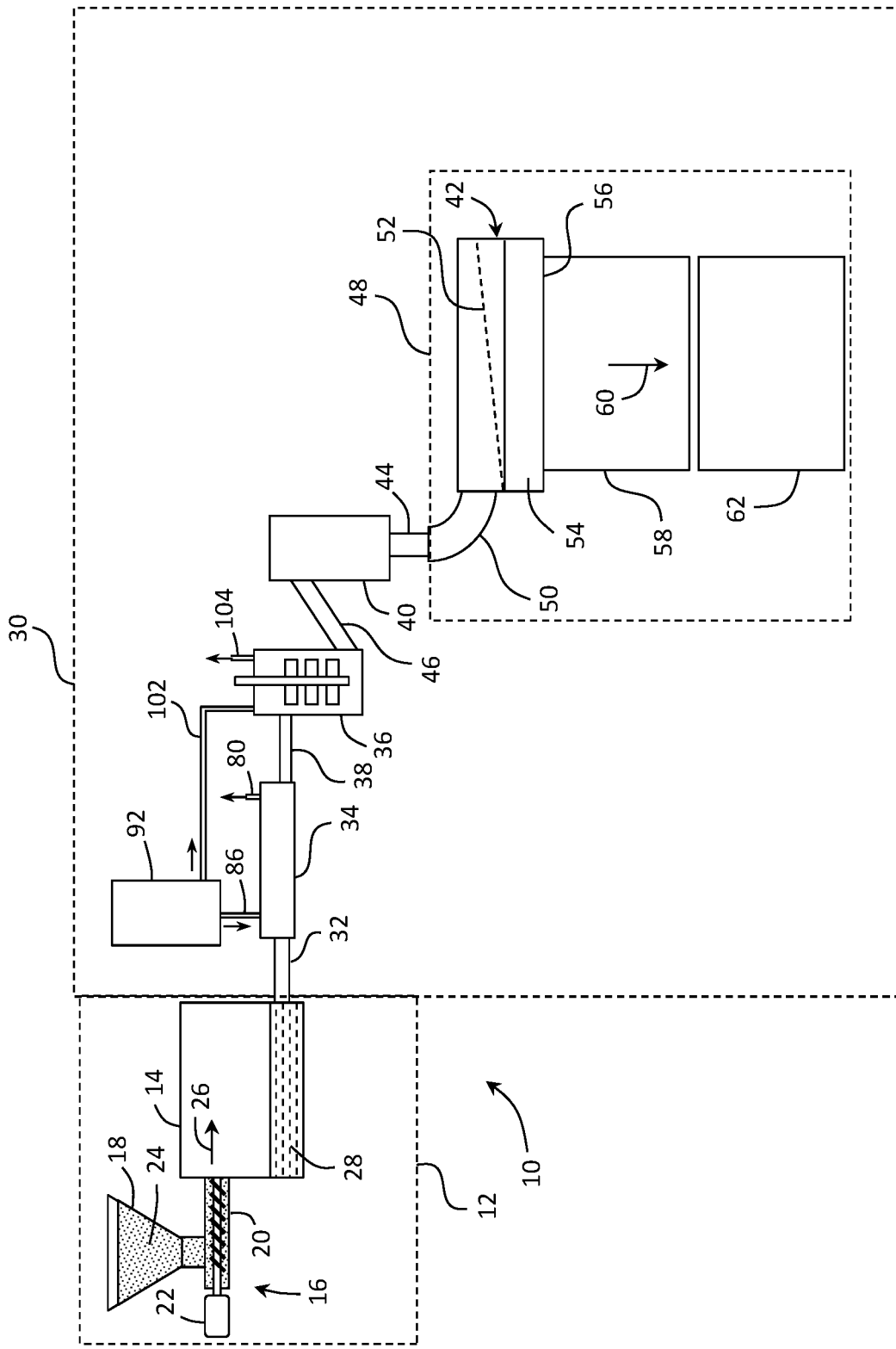
FIG. 3 is a schematic view of an exemplary glass making apparatus according to embodiments of the disclosure.

Shown in FIG. 3 is an exemplary glass manufacturing apparatus 10. In some embodiments, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners and/or electrodes) configured to heat raw material and convert the raw material into molten glass. For example, melting vessel 14 may be an electrically-boosted melting vessel, wherein energy is added to the raw material through both combustion burners and by direct heating, wherein an electric current is passed through the raw material, and thereby adding energy via Joule heating of the raw material. As used herein, an electrically-boosted melting vessel is a melting vessel that obtains heat energy from both Joule heating and above-the-glass-surface combustion heating, and the amount of energy imparted to the raw material and/or melt via Joule heating is equal to or greater than about 20% of the total energy added to the melt.

In further embodiments, glass melting furnace 12 may include thermal management devices (e.g., insulation components) that reduce heat loss from the melting vessel. In still further embodiments, glass melting furnace 12 may include electronic devices and/or electromechanical devices that facilitate melting of the raw material into a glass melt. Still further, glass melting furnace 12 may include support structures (e.g., support chassis, support member, etc.) or other components.

Glass melting vessel 14 is typically formed from a refractory material, such as a refractory ceramic material, for example a refractory ceramic material comprising alumina or zirconia, although the refractory ceramic material may comprise other refractory materials, such as yttrium (e.g., yttria, yttria stabilized zirconia, yttrium phosphate), zircon ($ZrSiO_4$) or alumina-zirconia-silica or even chrome oxide, used either alternatively or in any combination. In some examples, glass melting vessel 14 may be constructed from refractory ceramic bricks.

In some embodiments, melting furnace 12 may be incorporated as a component of a glass manufacturing apparatus configured to fabricate a glass article, for example a glass ribbon of an indeterminate length, although in further embodiments, the glass manufacturing apparatus may be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be incorporated as a component of a glass manufacturing apparatus comprising a slot draw apparatus, a float bath apparatus, a down draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 3 schematically illustrates glass melting furnace 12 as a component of a fusion down draw glass manufacturing apparatus 10 for fusion drawing a glass ribbon for subsequent processing into individual glass sheets or rolling the glass ribbon onto a spool.

Glass manufacturing apparatus 10 (e.g., fusion down draw apparatus 10) can optionally include an upstream glass manufacturing apparatus 16 positioned upstream relative to glass melting vessel 14. In some examples, a portion of, or the entire upstream glass manufacturing apparatus 16, may be incorporated as part of the glass melting furnace 12.

As shown in the embodiment illustrated in FIG. 3, the upstream glass manufacturing apparatus 16 can include raw material storage bin 18, raw material delivery device 20 and motor 22 connected to the raw material delivery device. Raw material storage bin 18 may be configured to store a quantity of raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 such that raw material delivery device 20 delivers a predetermined amount of raw material 24 from the storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, in an initial melting step, raw material is added to the melting vessel as particles, for example as comprising various "sands". Raw material may also include scrap glass, e.g., cullet, from previous melting and/or forming operations. Combustion burners are typically used to begin the melting process. In an electrically boosted melting process, once the electrical resistance of the raw material is sufficiently reduced (e.g., when the raw materials begin liquefying), electric boost is begun by developing an electric potential between electrodes positioned in contact with the raw materials, thereby establishing an electric current through the raw material, the raw material typically entering, or in, a molten state.

Glass manufacturing apparatus 10 can also optionally include a downstream glass manufacturing apparatus 30 positioned downstream of glass melting furnace 12 relative to a flow direction of the molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, may be incorporated as part of the glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy comprising from about 70% to about 90% by weight platinum and about 10% to about 30% by weight rhodium. However, other suitable metals can include molybdenum, rhenium, tantalum, titanium, tungsten and alloys thereof.

Downstream glass manufacturing apparatus 30 can include a first conditioning (i.e. processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may drive molten glass 28 through first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated in a secondary vessel to continue the melting process or cooled to a temperature lower than the temperature of the molten glass in the primary melting vessel before entering the fining vessel.

As described previously, bubbles may be removed from molten glass 28 by various techniques. For example, raw material 24 may include multivalent compounds (i.e. fining agents) such as tin oxide that, when heated, undergo a chemical reduction reaction and release oxygen. Other suitable fining agents include without limitation arsenic, antimony, iron and cerium, although as noted previously, the use of arsenic and antimony may be discouraged for environmental reasons in some applications. Fining vessel 34 is heated to a temperature greater than the melting vessel temperature, thereby heating the fining agent. Oxygen enriched bubbles produced by the temperature-induced chemical reduction of one or more fining agents included in the melt rise through the molten glass within the fining vessel, wherein gases in the molten glass produced in the melting furnace during the melting process can coalesce or diffuse into the oxygen enriched bubbles produced by the fining agent. The enlarged gas bubbles with increased buoyancy can then rise to a free surface of the molten glass within the fining vessel, pop, and the gas therein then vented out of the fining vessel. The oxygen bubbles can further induce mechanical mixing of the molten glass in the fining vessel as they rise through the molten glass.

Bubbles at the surface of the molten glass in one or more vessels of the glass making apparatus, for example the fining vessel, generally rise as single bubbles and may form a layer of bubbles commonly no greater than a single bubble deep on the free surface of the molten glass. Some glass making processes, such as submerged combustion processes, can produce thick, persistent foam on the surface of the molten glass many bubbles deep and wherein the melt itself may include up to 30% voids. As used herein, foam is a collection of a large volume of gas separated by thin, interconnected membranes. Examples of foam are the head on a glass of beer and a bubble bath. On the other hand, bubbles reaching the free surface of the molten glass that are the subject of the present disclosure are typically singular in nature and rise through the molten glass much like bubbles in a glass of champagne, and are to be distinguished from the persistent, thick foam found in a melting furnace, or methods wherein a below-surface combustion process is being conducted. Methods described herein may be useful in addressing foam formation and persistence. However, effectiveness is reduced because only the surface layer of bubbles comprising the foam is exposed to the surfactant.

The downstream glass manufacturing apparatus 30 can further include another conditioning vessel, such as a mixing apparatus 36, for example a stirring vessel, for mixing the molten glass that flows downstream from fining vessel 34. Mixing apparatus 36 can be used to provide a homogenous glass melt, thereby reducing chemical or thermal inhomogeneities that may otherwise exist within the fined molten glass exiting the fining vessel. As shown, fining vessel 34 may be coupled to mixing apparatus 36 by a second connecting conduit 38. In some embodiments, molten glass 28 may be gravity fed from the fining vessel 34 to mixing apparatus 36 through second connecting conduit 38. For instance, gravity may drive molten glass 28 through second connecting conduit 38 from fining vessel 34 to mixing apparatus 36. Typically, the molten glass within the mixing apparatus includes a free surface, with a free volume extending between the free surface and a top of the mixing apparatus. It should be noted that while mixing apparatus 36 is shown downstream of fining vessel 34 relative to a flow direction of the molten glass, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. These multiple mixing apparatus may be of the same design or they may be of a different design from one another. In some embodiments, one or more of the vessels and/or conduits may include static mixing vanes positioned therein to promote mixing and subsequent homogenization of the molten glass.

Downstream glass manufacturing apparatus 30 can further include another conditioning vessel such as delivery vessel 40 that may be located downstream from mixing apparatus 36. Delivery vessel 40 may condition molten glass 28 to be fed into a downstream forming device. For instance, delivery vessel 40 can act as an accumulator and/or flow controller to adjust and provide a consistent flow of molten glass 28 to forming body 42 through exit conduit 44. The molten glass within delivery vessel 40 can, in some embodiments, include a free surface, wherein a free volume extends upward from the free surface to a top of the delivery vessel. As shown, mixing apparatus 36 may be coupled to delivery vessel 40 by third connecting conduit 46. In some examples, molten glass 28 may be gravity fed from mixing apparatus 36 to delivery vessel 40 through third connecting conduit 46. For instance, gravity may drive molten glass 28 through third connecting conduit 46 from mixing apparatus 36 to delivery vessel 40.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down draw glass making apparatus can comprise a trough 52 positioned in an upper surface of the forming body and converging forming surfaces 54 (only one surface shown) that converge in a draw direction along a bottom edge (root) 56 of the forming body. Molten glass delivered to the forming body trough via delivery vessel 40, exit conduit 44 and inlet conduit 50 overflows the walls of the trough and descends along the converging forming surfaces 54 as separate flows of molten glass. It should be noted that the molten glass within the forming body trough comprises a free surface, and a free volume extends from the free surface of the molten glass to the top of an enclosure within which the forming body is positioned. The flow of molten glass down at least a portion of the converging forming surfaces is intercepted and directed by a dam and edge directors. The separate flows of molten glass join below along a bottom edge (root) 56 of the forming body where the converging forming surfaces meet to produce a single ribbon of molten glass 58 that is drawn in a draw direction 60 from root 56 by applying a downward tension to the glass ribbon, such as by gravity, edge rolls and pulling rolls (not shown), to control the dimensions of the glass ribbon as the molten glass cools and a viscosity of the material increases. Accordingly, glass ribbon 58 goes through a visco-elastic transition and acquires mechanical properties that give glass ribbon 58 stable dimensional characteristics. Glass ribbon 58 may in some embodiments be separated into individual glass sheets 62 by a glass separation apparatus (not shown) in an elastic region of the glass ribbon, while in further embodiments, the glass ribbon may be wound onto spools and stored for further processing.

Principals that are the subject of the present disclosure will now be described in the context of a fining vessel, with the understanding that such principals are not limited to a fining vessel and may be applied to other vessels comprising a free volume overtop a volume of molten glass, such vessels including stirring vessels, delivery vessels, and other vessels that contain and/or convey molten glass and may include a free volume. As used hereinafter, the term "vessels" will be considered to encompass both discrete processing vessels, for example fining vessels and stirring vessels, and conduits connecting such discrete processing vessels.

Figure 4:
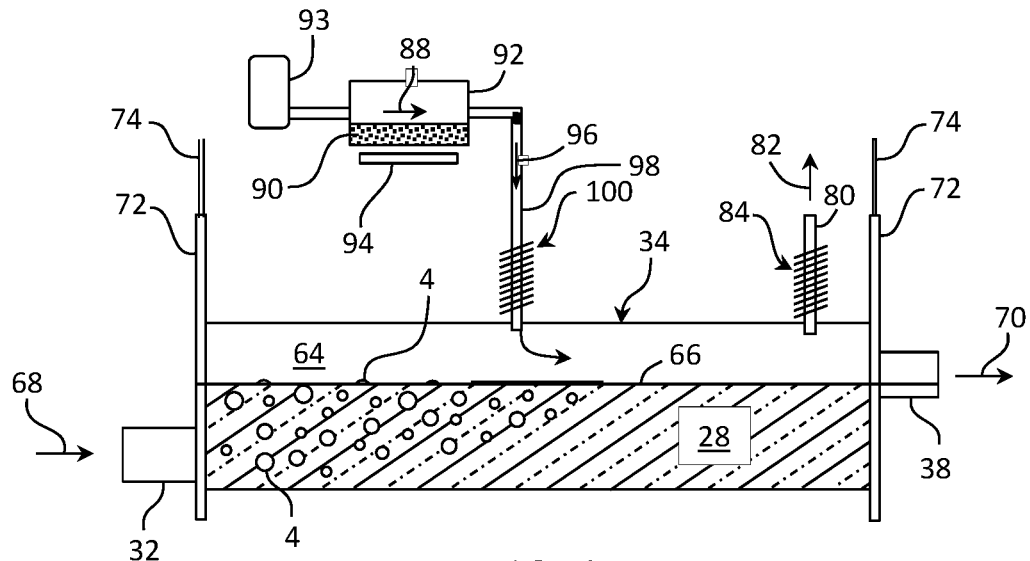
FIG. 4 is a cross sectional drawing of an exemplary fining vessel comprising an enrichment gas supply tube for providing an enrichment gas to the fining vessel.

FIG. 4 is a cross sectional side view of an exemplary fining vessel 34. In accordance with FIG. 4, fining vessel 34 comprises a volume of molten glass 28 flowing therethrough, and a gaseous atmosphere contained within free volume 64 positioned above free surface 66 of molten glass 28. Molten glass flows into fining vessel 34 at a first end, as indicated by arrow 68, and flows out an opposing second end, as indicated by arrow 70. For example, molten glass 28 can flow into fining vessel 34 via conduit 32, and out of fining vessel 34 via second connecting conduit 38. The molten glass within fining vessel 34 can be heated to a temperature greater than the melting temperature, for example in a range from about 1600° C. to about 1720° C., such as in a range from about 1650° C. to 1700° C., typically by an electric current conducted within the vessel itself, although in further embodiments, fining vessel 34 can be heated by other means, for example by external heating elements (not shown).

As shown in FIG. 4, fining vessel 34 can comprise electrical flanges 72, for example at least two electrical flanges, in electrical communication with an electrical power source (not shown) through respective electrode portions 74 and suitable conductors such that an electric current is conducted between the electrical flanges and through the intervening wall or walls of the fining vessel. In some embodiments, a multitude of electrical flanges may be used, for example three electrical flanges, four electrical flanges, or even five electrical flanges or more, whereby the fining vessel can be thermally divided into a plurality of temperature zones by differential localized heating of the temperature zones, for example between pairs of electrical flanges.

The increased buoyancy of bubbles 4 due to bubble growth, and reduced viscosity of the molten glass resulting from the temperature increase, simultaneously increases upward force on the bubbles and decreases resistance to the upward rise of bubbles 4 within the molten glass, thereby facilitating the rise of the bubbles to free surface 66. At free surface 66, the bubbles may pop, and the gas contained therein released into free volume 64. The gas may, in some embodiments, be vented out of the fining vessel via optional vent tube 80, as indicated by arrow 82. In embodiments, vent tube 80 may be heated, for example by one or more heating elements such as external electrical resistance heating element(s) 84, although in further embodiments, vent tube 80 may be heated by conducting an electric current directly within the vent tube in a manner similar to fining vessel 34. Heating of vent tube 80 can prevent the accumulation of condensates at the vent tube, for example condensed volatile materials, minimizing the possibility the resultant condensates can fall into the molten glass and become defects. However, as further described, some bubbles, upon reaching free surface 66, may not pop even during a prolonged residence time at free surface 66 for reasons previously described, and may become re-entrained within the molten glass flowing through the fining vessel.

In accordance with embodiments described herein, a carrier gas 88 is flowed over volatile material 90. The volatile material 90 can be contained, for example, in surfactant distribution vessel 92, which in turn is in fluid communication with a carrier gas source 93. For example, in some embodiments, the carrier gas source can comprise a bottled carrier gas. The surfactant distribution vessel 92 can be heated by heating element 94, whereupon the volatile material in surfactant distribution vessel 92 is vaporized and entrained in carrier gas 88 to form enrichment gas 96 for enriching the atmosphere in free volume 64 with a volatilized material that functions as a surfactant. In various embodiments, heating element 94 can be a resistance heating element. However, in further embodiments, surfactant distribution vessel 92 may include electrical flanges and be directly heated in a manner similar to fining vessel 34. In still further embodiments, surfactant distribution vessel 92 can be heated by a combustion burner.

Enrichment gas 96 can be conveyed to and injected into free volume 64 above free surface 66 via fining vessel enrichment gas supply tube 98 is fluid communication with surfactant distribution vessel 92. Enrichment gas 96 can comprise an inert carrier gas, for example nitrogen, or a noble gas such as argon, krypton, or other non-reactive gas or gases. The carrier gas may comprise $O_2$ at levels compatible with the vessel material. For example, oxygen in the carrier gas may be kept at concentrations that avoid oxidation of the fining vessel.

Enrichment gas 96 further comprises one or more volatized materials, for example, at least one of an alkali (e.g., Li, Na, K, Rb, Cs, or Fr), or an alkali earth (e.g., Be, Mg, Ca, Sr, Ba, or Ra), B, V, Ti, or F. For the sake of discussion and not limitation, further description will be directed to boron (e.g., $B_2O_3$) as a volatilized material carried by enrichment gas 96. While surfactant distribution vessel 92 of FIG. 4 is shown connected to fining vessel 34 and mixing apparatus 36, individual surfactant distribution vessels 92 may be used such that fining vessel 34 and/or mixing apparatus 36, and/or any other vessel of downstream glass making apparatus 30, can be supplied with an enrichment gas by individual, dedicated surfactant distribution vessels, such as shown in FIG. 4, or a combination of individual and communal surfactant distribution vessels.

In some embodiments, enrichment gas supply tube 98 can be heated, thereby heating the enrichment gas supplied to fining vessel 34 and avoiding condensation of the volatilized component (e.g., $B_2O_3$) in enrichment gas supply tube 98. For example, fining vessel enrichment gas supply tube 98, and thereby enrichment gas 96, may be heated by one or more heating elements such as external electrical resistance heating element(s) 100, although in further embodiments, fining vessel enrichment gas supply tube 98 may be heated by conducting an electric current directly within the fining vessel gas supply tube in a manner similar to the method of heating fining vessel 34. For example, fining vessel enrichment gas supply tube 98 may include one or more electrical flanges (not shown) in electrical communication with an electrical power source as described in respect of fining vessel 34.

Laboratory experiments using Corning® Eagle XG® glass at 1650° C. show an approximate $B_2O_3$ volatilization rate of about $5.5\times10^{-8}$ moles/cm$^2$·s in dry air over a four-hour period. Using as an example a 30-minute surface residence time and a boron diffusivity of $1\times10^{-5}$ cm$^2$/s, an estimated $B_2O_3$ depletion for the glass melt is between about 1% and 2% of the initial $B_2O_3$ in the surface diffusion layer. The resulting surface tension shift from this amount of depletion raises concerns that Marangoni flow and irregular bubble membrane drainage will lead to very long lifetimes for surface bubbles.

To prevent volatilization of $B_2O_3$ from the surface of the molten glass in the fining vessel, a partial pressure of $B_2O_3$ in the fining vessel atmosphere occupying free volume 64 at least equal to the equilibrium partial pressure of the glass melt at fining vessel operating temperatures can be provided.

Figure 5:
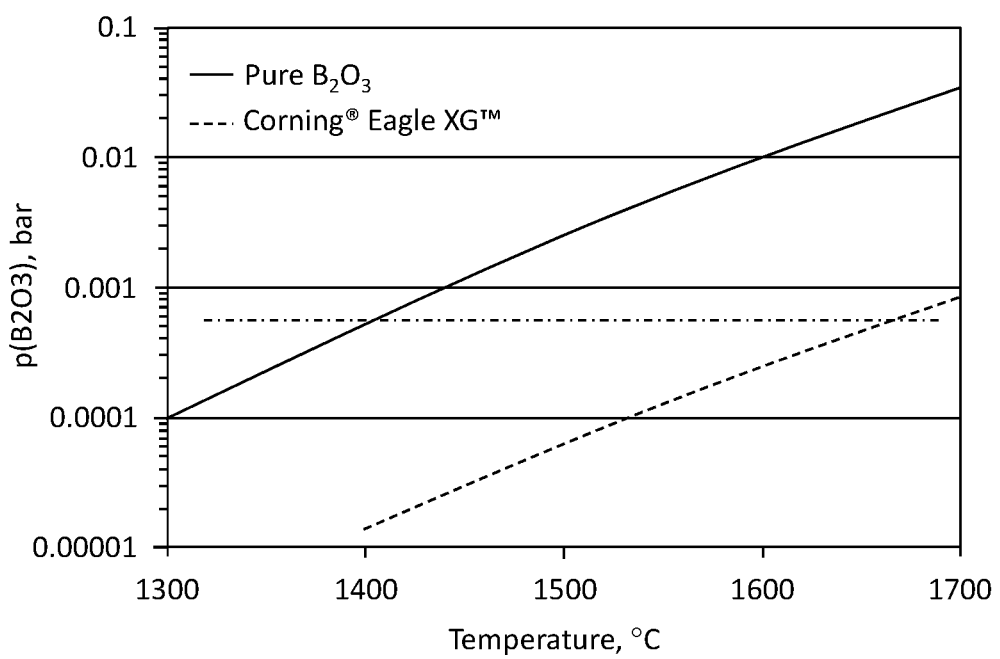
FIG. 5 is plot of the equilibrium partial pressure of $B_2O_3$ as a function of temperature for pure $B_2O_3$ and Corning® Eagle XG™ glass.

FIG. 5 is a plot illustrating the equilibrium partial pressure of $B_2O_3$ for pure $B_2O_3$ (e.g., equal to or greater than about 99% by weight $B_2O_3$) and Corning® Eagle XG® as a function of temperature. As an example of boron atmosphere enrichment for this glass using a pure $B_2O_3$ source, a $B_2O_3$ partial pressure of approximately $5.5\times10^{-4}$ bar for a 1670° C. molten glass temperature in the fining vessel can be generated by pure $B_2O_3$ at about 1400° C. In this example, the volatized $B_2O_3$ can be directed into the fining vessel free volume 64 without the need for a carrier gas. That is, in accordance with the example, volatilization of $B_2O_3$ from the surface of the molten glass in the fining vessel can be compensated by a pure $B_2O_3$ source at a temperature of 1400° C., wherein the volatilized $B_2O_3$ from the pure $B_2O_3$ source is delivered to the fining vessel.

Using a pure $B_2O_3$ supply reservoir at 1400° C. or greater can reduce the driving force for surface volatilization and lead to a more uniform surface tension and regular drainage. If the carrier gas flowing over the $B_2O_3$ source results in a significant dilution of the $B_2O_3$ vaporizing from the source melt, the temperature of the $B_2O_3$ source can be increased to bring the partial pressure of $B_2O_3$ into the desired range. That is, the amount of $B_2O_3$ carried to fining vessel 34, and the partial pressure of $B_2O_3$ therein, can be controlled by controlling a temperature of the source of $B_2O_3$.

In some embodiments, there may be only small losses due to $B_2O_3$ volatilization at the surface of the glass melt, so a large flux of $B_2O_3$ from surfactant distribution vessel 92 may not be needed. In other embodiments, a carrier gas allows controlled supply of $B_2O_3$ to the fining vessel (and/or mixing apparatus, e.g., stirring vessel) atmosphere. For example, $B_2O_3$ delivery can be limited where local cooling or rapid depletion of the $B_2O_3$ source are not incurred. On the other hand, an increased $B_2O_3$ source temperature can compensate for carrier gas dilution and maintain the desired partial pressure of $B_2O_3$ in the free volume, e.g., free volume 64. The surfactant distribution vessel should be refillable to provide for continuous operation. In some embodiments, the $B_2O_3$ source can be pure $B_2O_3$ (e.g., equal to or greater than about 99% by weight $B_2O_3$) held at a controlled temperature, although in further embodiments, the $B_2O_3$ source can be, for example, a boron-comprising glass melt including significantly less $B_2O_3$ than a pure source. For example, a glass melt comprising 10% CaO, 20% $B_2O_3$ and 70% $SiO_2$ can produce approximately one half the $B_2O_3$ vapor pressure of pure $B_2O_3$ in a temperature range from about 1200° C. to about 1600° C.

The partial pressure of $B_2O_3$ ($pB_2O_3$) will be affected both by the temperature in the $B_2O_3$ source vessel and the flow rate of the carrier gas. The amount of $B_2O_3$ vaporized per unit time is equal to the volatilization rate times the surface area of molten $B_2O_3$. The equivalent volume of $B_2O_3$, Vb, as given by the ideal gas law, will be diluted by the volume of carrier gas supplied in unit time, Vc, giving a $B_2O_3$ concentration in the gas stream of $X_{(B2O3)}$=Vb/(Vb+Vc), or a partial pressure of $X_{(B2O3)}\cdot 1$ bar for a system at atmospheric pressure. This partial pressure must be at least equal to the equilibrium vapor pressure of $B_2O_3$ over the molten glass 28 to suppress $B_2O_3$ volatilization. It should be recognized that various combinations of $B_2O_3$ source temperature, $B_2O_3$ source surface area, and carrier gas flow rate can be used to provide the desired partial pressure of $B_2O_3$ supplied to the free volume of the designated vessel (e.g., fining vessel and/or stirring vessel). Furthermore, glass melts other than pure $B_2O_3$ can be used as source baths, but pure $B_2O_3$ has the advantage of a constant volatilization rate over time. For example, a $B_2O_3$—$SiO_2$ solution would experience $B_2O_3$ depletion and $SiO_2$ enrichment at the surface of the $B_2O_3$ source melt and require an adjustment of measured, periodic replenishment of $B_2O_3$, or stirring of the source melt, to assure delivery of the desired $B_2O_3$ partial pressure to the receiving free volume (e.g., free volume 64).

In accordance with the foregoing, $B_2O_3$ loss both from the molten glass surface layer (e.g., free surface 66) and from bubble membranes can be reduced or even prevented by creating a partial pressure of $B_2O_3$ in free volume 64 (e.g., within the atmosphere occupying free volume 64) equal to or greater than the equilibrium partial pressure of $B_2O_3$ in free volume 64 at fining vessel operating temperatures. A boron-rich atmosphere thereby assists surface bubble removal by promoting regular drainage of the bubble membrane. If the surface layer maintains a high concentration of $B_2O_3$ and a resultant lower surface tension, a bubble emerging from the surface will experience lower downward force opposing emergence, and upon emergence normal drainage of the bubble membrane will allow the bubble membrane to reach critical rupture thickness more rapidly.

In the case of $B_2O_3$ it may be favorable to use a humid carrier gas to increase the $B_2O_3$ volatilization rate from the $B_2O_3$ source because of the formation of volatile hydrated compounds, for example boric acid ($H_3BO_3$), which vaporizes at 300° C. In addition, water addition to bubble membranes can further decrease the surface tension and viscosity, decreasing drainage times somewhat. High humidity has been shown in lab experiments to shorten surface bubble lifetime significantly. Accordingly, in some embodiments, a dew point of the enrichment gas can be in a range from about 41° C. to about 92° C., for example in a range from about 60° C. to about 92° C., or in a range from about 80° C. to about 92° C. For example, in some embodiments, the carrier gas may be supplied through a humidifier (not shown) before entering surfactant distribution vessel 92.

As previously noted, the concentration of $B_2O_3$ in the enrichment gas can be controlled by controlling a flow rate of carrier gas through surfactant distribution vessel 92. For example, reducing a flow rate of the carrier gas can provide an increased residence time of the carrier gas in the surfactant distribution vessel, thereby increasing the concentration of $B_2O_3$ in the enrichment gas, and the concentration of $B_2O_3$ delivered to the fining vessel.

A flow rate of enrichment gas 96 can be in a range from equal to or greater than about 1 (one) turnover per minute to equal to or less than about 1 turnover per hour, including all ranges and subranges therebetween. As used herein, "turnover" means a flow rate equivalent to the volume of the free volume per unit time. As example, for a 1 cubic meter volume, 1 turnover per minute means a gas flow rate equal to 1 cubic meter per minute. A gas supplied to a 4 cubic meter volume at a rate of 2 turnovers per minute means a flow rate of 8 cubic meters per minute. The flow rate will depend on the size of the free volume supplied with the enrichment gas, for example in a range from about 0.02 turnovers per minute to about 1 turnover per minute, in a range from about 0.05 turnovers per minute to about 1 turnover per minute, in a range from about 0.1 turnovers per minute to about 1 turnover per minute, in a range from about 0.5 turnovers per minute to about 1 turnover per minute, or in a range from about 0.8 turnovers per minute to about 1 turnover per minute.

It should be appreciated that the enrichment gas flow should minimize heating or cooling of the free surface, as temperature non-uniformity may result in surface tension gradients and Marangoni forces.

An increased $B_2O_3$ partial pressure in the atmosphere above the molten glass may increase the $B_2O_3$ content of the molten glass surface layer. However, the normally depleted surface is only about one millimeter thick, representing a small fraction of the molten glass flow cross-section. To compensate, the amount of $B_2O_3$ in the raw material provided to melting vessel 14 can be slightly adjusted to compensate for boron changes in glass composition. Accordingly, $B_2O_3$ partial pressures above that needed to suppress volatilization from the bubble membranes should be avoided to avoid secondary issues such as boron oxide condensation on cooler surfaces within free volume 64 and associated plumbing.

It will be apparent to those skilled in the art that various modifications and variations can be made to embodiments of the present disclosure without departing from the spirit and scope of the disclosure. For example, while the preceding description centered on fining vessels and stirring vessels, the principals described herein can be applied to other vessels comprising molten glass with a free surface. In addition, volatile surfactant materials other than $B_2O_3$ can be used, as described herein, either in addition to $B_2O_3$, or as alternatives to $B_2O_3$, provided such other volatile surfactant materials are compatible with the molten glass being processed through the vessel (e.g., do not modify characteristics of the resultant glass article). Thus, it is intended that the present disclosure cover such modifications and variations provided they come within the scope of the appended claims and their equivalents.

What is claimed is:

1. A method of reducing bubble lifetime in a glass making process, comprising:
    forming a first molten glass in a melting vessel;
    directing the first molten glass through a conditioning vessel downstream of the melting vessel, the conditioning vessel comprising a free volume above a free surface of the first molten glass in the conditioning vessel; and
    flowing an enrichment gas comprising a volatile material into the free volume, the volatile material reducing a surface tension of the first molten glass in the conditioning vessel, wherein a source of the volatile material is a second molten glass.

2. The method according to claim 1, wherein the flowing an enrichment gas comprises flowing a carrier gas over the source of the volatile material and heating the source of volatile material.

3. The method according to claim 2, further comprising controlling a concentration of the volatile material in the enrichment gas by controlling a temperature of the source of volatile material.

4. The method according to claim 1, wherein an atmosphere in the free volume is saturated with the volatilized material.

5. The method according to claim 1, wherein the conditioning vessel comprises a fining vessel or a stirring vessel.

6. The method according to claim 1, wherein the volatile material comprises $B_2O_3$.

7. A method of reducing bubble lifetime in a glass making process, comprising:
    forming a first molten glass in a melting vessel;
    flowing the first molten glass through a conditioning vessel downstream of the melting vessel, the conditioning vessel comprising a free volume above a free surface of the first molten glass;
    flowing a carrier gas through a surfactant distribution vessel comprising a source of $B_2O_3$,
    wherein the source of $B_2O_3$ is a glass;
    heating the surfactant distribution vessel to melt the source of $B_2O_3$ and form a second molten glass and a boron-comprising vapor;
    entraining the boron-comprising vapor in the carrier gas to form an enrichment gas; and
    flowing the enrichment gas into the free volume of the conditioning vessel.

8. The method according to claim 7, wherein the free volume comprises an atmosphere, and a concentration of $B_2O_3$ in the atmosphere is maintained in saturation.

9. The method according to claim 7, wherein a partial pressure of $B_2O_3$ in the free volume is equal to or greater than a partial pressure of $B_2O_3$ within a bubble in the first molten glass.

10. The method according to claim 7, wherein a partial pressure of $B_2O_3$ in the free volume is controlled by controlling a temperature of the source of $B_2O_3$ in the surfactant distribution vessel.

11. The method according to claim 7, wherein the source of $B_2O_3$ is pure $B_2O_3$.

12. The method according to claim 7, wherein the conditioning vessel comprises a fining vessel.

13. The method according to claim 7, wherein the conditioning vessel comprises a stirring vessel.

14. The method according to claim 7, further comprising directing the first molten glass from the conditioning vessel to a forming body and drawing the first molten glass from the forming body.

* * * * *